United States Patent [19]

Trested, Jr.

[11] 4,395,772
[45] Jul. 26, 1983

[54] LINE PROTECTION SWITCH CONTROLLER

[75] Inventor: Warren C. Trested, Jr., East Hampstead, N.H.

[73] Assignee: Bell Telephone Laboratories, Incorporated, Murray Hill, N.J.

[21] Appl. No.: 259,006

[22] Filed: Apr. 30, 1981

[51] Int. Cl.³ .............................................. H04B 7/08
[52] U.S. Cl. .................................... 375/40; 455/132; 340/825.01; 340/825.03
[58] Field of Search ................... 375/8, 38, 39, 40, 52, 375/100, 102; 455/132-135, 140, 8; 371/67, 68; 328/72, 112; 340/825.01, 825.03

[56] References Cited

U.S. PATENT DOCUMENTS

| 3,213,370 | 10/1965 | Featherston | 375/100 |
|---|---|---|---|
| 3,681,694 | 8/1972 | Sarati | 455/8 |
| 3,870,955 | 3/1975 | Ouvrier | 455/8 |
| 3,878,463 | 4/1975 | Lanigan | 455/8 |
| 3,975,687 | 8/1976 | Tan et al. | 455/133 |
| 3,991,278 | 11/1976 | Fang et al. | 370/16 |
| 4,015,205 | 3/1977 | Ikeda et al. | 375/100 |
| 4,035,728 | 7/1977 | Ishikawa et al. | 455/132 |
| 4,039,953 | 8/1977 | Chadwick | 455/135 |
| 4,052,670 | 10/1977 | Watanabe et al. | 375/3 |
| 4,143,321 | 3/1979 | Norsworthy | 375/10 |
| 4,234,956 | 11/1980 | Adderley et al. | 455/8 |
| 4,246,656 | 1/1981 | Wood et al. | 455/136 |
| 4,270,210 | 5/1981 | Tan et al. | 435/132 |

OTHER PUBLICATIONS

Griffiths & Nedelka "100A Protection Switching System", Dec. 1965, Bell Sys. Technical Journal, pp. 2295-2336.
Griffith & Langan "Protection Switching", Sep. 1971, Bell System Technical Journal, pp. 2315-2343.

Primary Examiner—Benedict V. Safourek
Assistant Examiner—Stephen Chin
Attorney, Agent, or Firm—John Francis Moran

[57] ABSTRACT

An errorless line protection switching system utilizes a variable delay (29) in the spare channel (21-24, 26-29, 31-33) adjusted to provide data signal alignment with an impaired regular channel before substituting the spare channel for the regular channel. This switching system is able to provide bit error free channel substitution between the spare and any regular channel in a digital radio system by virtue of the data signal alignment capability. Data signal alignment is provided by first aligning clocking signals in fine incremental steps with each clocking signal derived from one of the two channels undergoing the substitution. Data signal alignment is then provided by shifting the spare channel in full bit positions until data alignment is indicated by a detector (119). Data signal alignment is also utilized to restore service to a regular channel so the spare channel may be removed from service.

8 Claims, 16 Drawing Figures

LINE PROTECTION SWITCH CONTROLLER

CROSS-REFERENCE TO RELATED APPLICATION

U.S. patent application Ser. No. 259,007 entitled "Errorless Line Protection Switcher" filed on even date herewith is directed to related subject matter concerning the inventive arrangement for obtaining synchronized signal timing and then data concurrence to provide efficient and reliable channel alignment for error free channel switching.

BACKGROUND OF THE INVENTION

This invention relates to protection switching for radio communication systems and, more particularly, it relates to switching between digital radio channels in an error free manner to insure system reliability.

Due to the occurrence in radio communication systems of frequency selective fading and possible equipment malfunctions, protection switching between a regular channel hampered by a transmission impairment and a standby, or spare, channel is known and used in the art. Each channel signal in such radio systems encounters a transmission delay that includes a constant portion whose value is peculiar to each channel and a time varying portion, because of the variability in atmospheric propagation introduced at each specific channel frequency.

In digital radio communication systems, this variable, or dynamic delay alone renders protection switching between a single standby channel, also known as a protection channel, and any one of a number of regular channels (referred to as 1XN) a difficult task. The precise timing attendant to digital signals is a further requirement such that 1XN protection systems for digital radio communications have heretofore been generally unavailable.

One type of conventional protection switching arrangement for digital transmission systems is a limited one-by-one (1X1) arrangement wherein a standby protection channel may only be substituted for a designated one of a number of regular channels. Such a protection provision is undesirable in terms of equipment duplication and congestion of the frequency spectrum at the radio frequencies.

The difficulty of this task has been so great that conventional protection switching systems even for one-by-one arrangements have principally been directed to maintaining framing on the digital bit screen rather than attempting the complete elimination of bit errors. Since a frame in a typical transmission format includes a predesignated large number of bits, the loss of framing will produce thousands of bit errors. However, the ultimate objective of any protection switching arrangement should be to provide error free operation when switching to a spare channel since only this is consistent with the intended purpose of offering such a feature.

Because the number of digital bit errors generally increases exponentially when the transmitted information signal experiences fading in a few decibels of attenuation, bit errors tend to grow rapidly. It would therefore be highly desirable for channel protection switching to occur when a transmission impairment is first detected with reliability to provide the best possible error performance by a digital radio transmission system. A further advantage to error free protection switching is the relaxation of constraints on switching for maintenance purposes since the error penalty of conventional protection switching arrangements restricts such maintenance switching to situations of absolute necessity.

A further requirement is occasioned by desynchronization arrangements used in current digital radio systems. The desynchronizers are used to provide the data signal and a recovered clock signal in the line receivers of such systems. Unfortunately, a pulse stuffing technique used in the desynchronizers produces timing jitter. This timing jitter is higher in frequency than the time varying portion of the variable delay mentioned previously. As a result, this places a further demand on the error free switching capability of a protection switching arrangement in a digital radio communication system.

SUMMARY OF THE INVENTION

The invention in its various aspects provides error free channel protection switching in the presence of signal timing jitter as a product of the variability in atmospheric propagation and pulse stuffing desynchronization timing jitter. Broadly, the invention takes the form of a controller of apparatus in a channel protection switching system which expediently adjusts relative signal timing between two digital channels carrying the same digital signal to enable the substitution of a spare channel for a service channel without introducing errors. The relative timing between the two digital channels is shifted in a first direction and then reversed while checking for signal alignment after each step of adjustment. This controller characteristic is highly desirable since the detector only senses the presence of signal alignment and is unable to indicate the direction of relative timing shift to effect signal alignment.

In some of the further aspects of the invention, the controller adjusts a shifter to change relative signal phase from an initial value in a first direction to a first extreme value and then in the opposite direction to the opposite extreme value. These adjustments are in the form of fine steps. The status of bit alignment is checked after each fine step and stopped when the detector indicates alignment. After bit alignment is obtained, data alignment is sought in a similar fashion using coarse adjustment steps equal to the duration of a bit period. After both bit and data alignment are obtained, the controller directs the channel substitution.

In some of the further aspects of the invention, the controller has the ability to make successive processes of adjustment of the relative signal timing when the detector fails to indicate alignment. The controller also has the ability to keep track of the number of attempts and directs alternate action when a prescribed limit of attempts occurs. The controller rechecks for bit alignment after each adjustment of data alignment. When bit alignment ceases to be indicated by the detector, the fine step process is used to restore it before the data alignment process is used. As a further check on the operation of the detector, the controller retards adjustment of the shifter one step and uses that adjustment or the previous one to maintain bit alignment.

Restoration of service from the spare channel back to the regular channel previously removed from service is provided by the controller. This only involves fine step adjustment since the channel being shifted is in service which should not be disrupted. The controller also has the ability to provide direct channel switching without timing and data synchronization when an out-of-frame condition occurs or when numerous attempts at such synchronization are not productive.

BRIEF DESCRIPTION OF THE DRAWING

A more complete understanding of the invention and the various features, advantages and objects thereof may be more readily understood by reference to the following detailed description in conjunction with the drawing.

DETAILED DESCRIPTION

Figure 1:
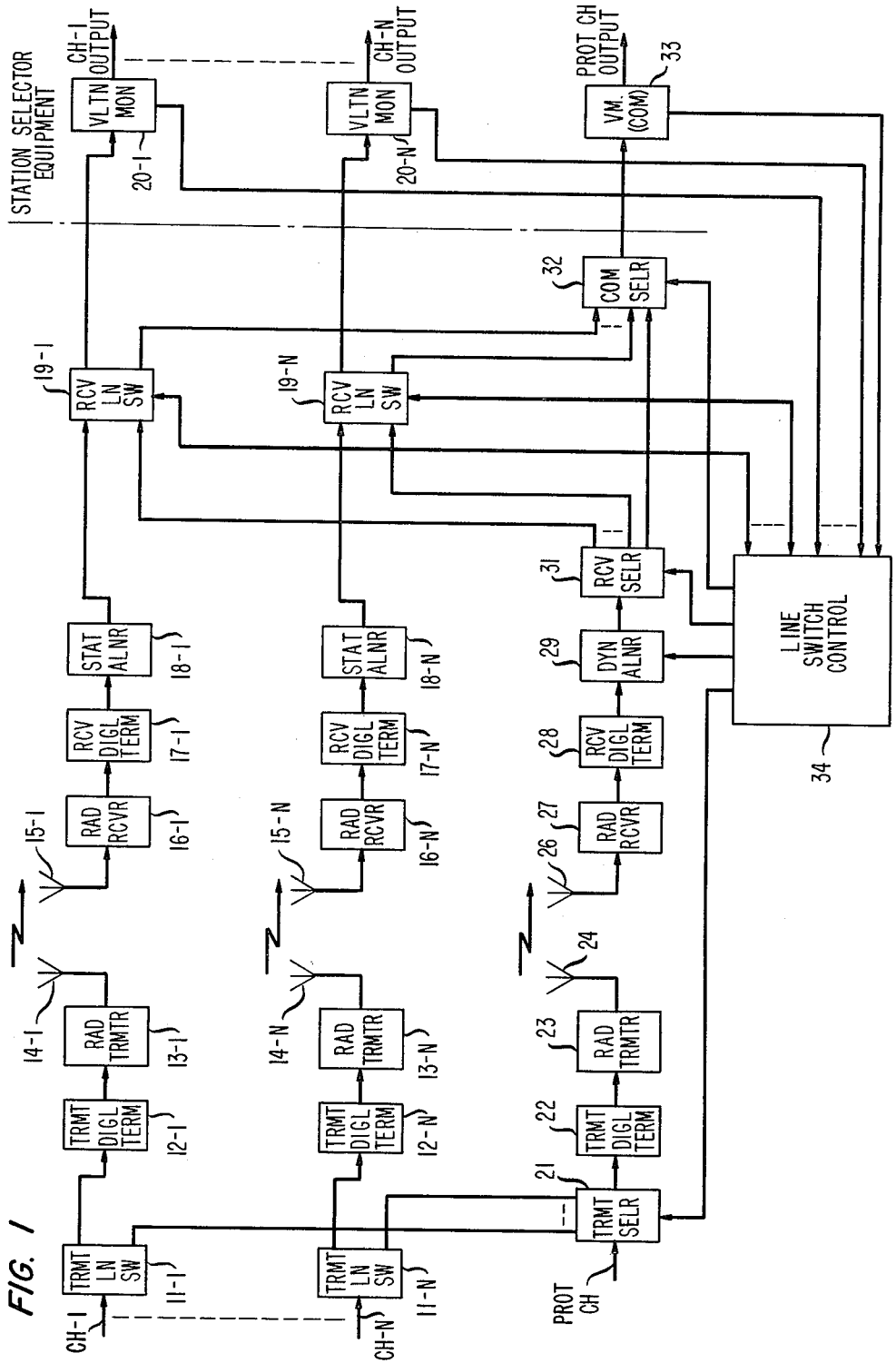
FIG. 1 depicts an application of the invention in a typical signal radio communication system.

FIG. 1 is a general block diagram of a digital radio system employing line protection switching in accordance with the invention. The radio transmission system as may be observed from FIG. 1 includes a plurality of N transmission channels and a single protection channel which may be substituted for any one of the N channels. Of course, it should be understood that this is a basic configuration of the channel protection arrangement which may be replicated a number of times in accordance with the overall channel capacity of the system.

Each regular channel at the transmit, or head end includes its own transmit line switch (TLS) 11, transmit digital terminal (TDT) 12, and radio transmitter (RT) 13 which energizes radio antenna 14. Typically, each channel is multiplexed on to the radio carrier signal to be transmitted by a single radio antenna so that individual antennae 14 are depicted symbolically. The receive end of each channel includes one of antennae (also symbolically shown) 15, radio receiver (RR) 16, receive digital terminal (RDT) 17, static aligner (SA) 18, receive line switch (RLS) 19, and violation monitor (VM) 20 which is associated with the output of the channel.

The protection channel includes transmit selector (TS) 21 which receives an input from each one of the transmit line switches 11, transmit digital terminal 22, radio transmitter 23 and antenna 24 all at the head end. The receive end of the protection channel includes antenna 26, radio receiver 27, receive digital terminal 28, dynamic aligner (DA) 29, receive selector (RS) 31, common selector (CS) 32 and violation monitor (common) 33. Line switch control 34 controls the line protection switching function in this arrangement in response to the outputs of violation monitors 20 and activates appropriate head end and receive end switches to maintain the reliability of the transmission channels.

Basically, the overall function for this arrangement is to detect transmission errors using parity bits in each of the regular channels and also the protection channel and then to substitute the protection channel for a regular channel when the latter produces errors. At this point it should be pointed out that each violation monitor provides two functions, one is to determine an error rate by counting the number of digital bits in a specified block and comparing that to the parity bit information associated with that block of information. When errors are detected, a violation monitor will not produce an output until a predesignated limit or threshold is exceeded. The second function of each violation monitor is to indicate an out-of-frame condition which is a failure to lock onto the digital bit stream. Such an indication, albeit uncommon, is a condition that will typically produce several tens of thousands of bit errors and accordingly a violation monitor issues an immediate distinct output upon detection of a loss of frame. Control 34 in response to this distinct output then arranges a direct channel substitution.

A paramount feature of this arrangement is that channel signal bit alignment is achieved between an impaired regular channel and the protection channel before channel switching is initiated so as to not produce bit errors and thereby increases system reliability. Before the system of FIG. 1 is used, static aligners 18 associated with each regular channel are manually adjusted so that the range of the delay of all the regular channels is within the middle of the variable range of dynamic aligner 29 in the protection channel. The electrical length of the protection channel is initially longer due to the extra delay inherent to the internal circuitry of selectors 21 and 31.

Figure 2:
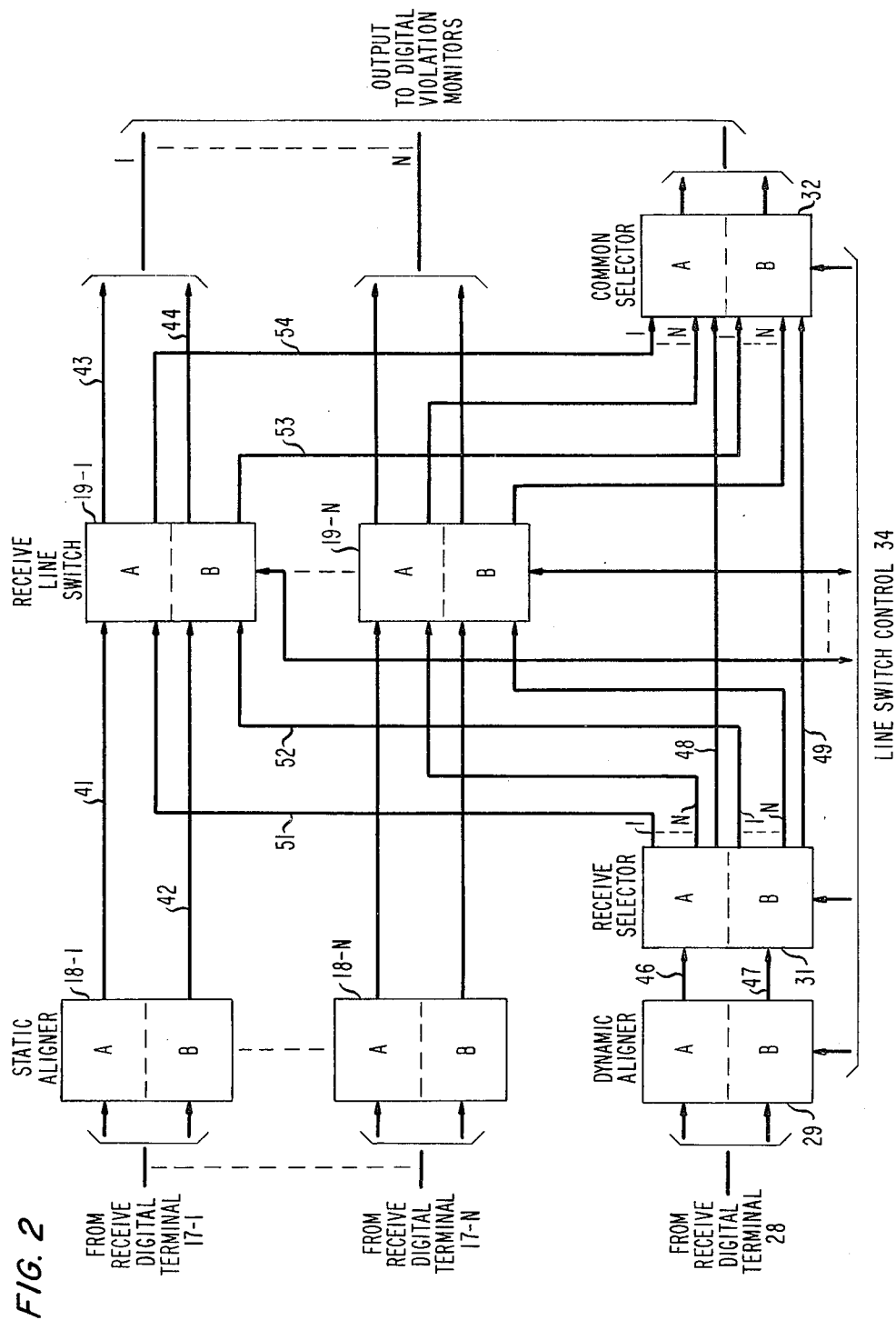
FIG. 2 is a more detailed block diagram illustrating suitable locations for various functions relating to the invention.

FIG. 2 illustrates the receive end switching arrangement in more detail. It should be pointed out at this point that each channel signal consists of two digital bit streams on an A and a B rail. Accordingly, each of the components in FIG. 2 is divided into an A and a B section as required for the dual rail channel signal. The dual rail signal for each of the regular channels is applied to static aligner 18 whose output is applied to a pair of input terminals on receive line switch 19. The input for the protection channel is applied to dynamic aligner 29 which feeds receive selector 31. The output of receive selector 31 is applied to common selector 32 and also switch 19. FIG. 2 shows the various inputs and outputs for line switch controller 34.

In order to provide an understanding of this arrangement the various switches will be described in terms of completed signal paths during normal operation when the violation monitors in the system are not indicating any error condition. Accordingly, for each regular channel the dual rail channel signal on lines 41 and 42 are effectively connected to lines 43 and 44 through signal paths completed in receive line switch 19. Concurrently, the dual rail signal for the protection channel on lines 46 and 47 at the input of receive selector 31 goes straight through to lines 48 and 49 of common selector 32 and then directly to the lines that provide the output signals. It should be understood that when the protection channel is not substituted for a regular channel, the protection channel is used to transmit a regular channel signal so that its error performance may be continuously monitored by violation monitor 33. In the event that the protection channel is generating errors, it is made unavailable for substitution of the regular channels.

At the initiation of the protection mode of the operation, a violation monitor produces an output associated with a channel impairment or channel failure. This output is sent to line switch controller 34 which activates the transmit line switch in the impaired regular channel and transmit selector 21 in the protection channel. This enables the protection channel to have the same channel signal input as the impaired regular channel. At the receive end, control 34 issues a signal to receive selector 31 to apply the duplicate channel signal input to the receive line switch. Assume, in this case, it to be the one designated in FIG. 2 as 19-1. As will become more apparent later, each receive line switch includes an alignment detector which provides an output signal to control 34 indicative of the difference in the electrical path lengths between the duplicate set of channel signals. Control 34 issues a control signal to adjust the delay of dynamic aligner 29. Accordingly, these components change the electrical path length of the protection channel so that its total transmission delay corresponds to that produced by the impaired regular channel.

When signal alignment occurs, controller 34 directs receive line switch 19-1 to apply the signal from the protection channel on lines 51 and 52 to output lines 43 and 44. At the same time, the channel signal input from the impaired regular channel on lines 41 and 42 is routed to output lines 53 and 54 for common selector 32. Under the direction of controller 34, common selector 32 opens the signal path provided during the normal mode of operation and establishes a signal path which connects the impaired regular channel signal to violation monitor 33. This is one instance for which violation monitor 33 is designated by (common) since it may, in fact, be used to monitor any one of the signal channels. Thus while in the protection mode not only is the substitution of the protection channel for the regular channel being violation monitored but also the performance of the impaired regular channel removed from service is being monitored.

When the output of violation monitor 33 indicates that the error performance of the impaired regular channel has been restored, controller 34 initiates a process wherein the impaired regular channel is substituted for the protection channel to restore the normal mode of operation. Again dynamic aligner 29 serves to equalize the electrical path lengths experienced by the channel signals so that the switching operation will not produce any bit errors. Once signal alignment occurs the alignment detector issues a signal to controller 34. Receive line switch 19 reverses its signal path configuration to produce the normal mode of operation.

Figure 3:
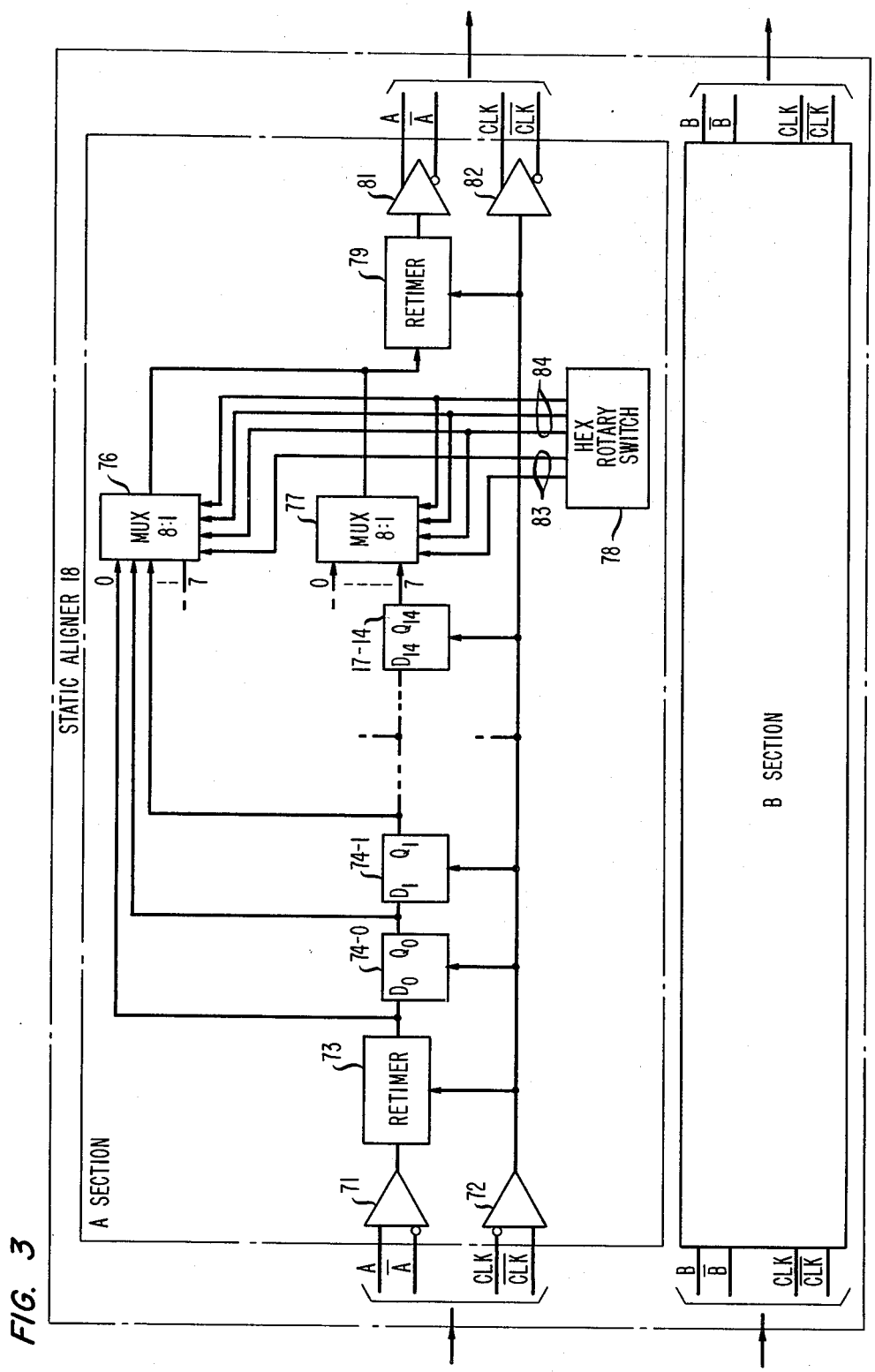
FIG. 3 is a diagram of a static aligner for varying the fixed signal propagation delay of the digital radio channel signal.

FIG. 3 illustrates the internal circuitry of Section A of static aligner 18. Section B of aligner 18 is simply shown as a block since its internal circuitry is identical to that in Section A. Line receivers 71 and 72 respectively receive the balanced data input on the A rail and the balanced clock input. It should be noted that balanced signals are used between physically displaced circuits for well known reasons concerning noise immunity. Receiver 71 converts the balanced A rail data to single ended data signals suitable for the internal circuitry therein. Similarly, receiver 72 provides a single ended clock signal which is used to strobe the various components.

Initially the proper relationship between the data and the clock signal is provided by retimer 73. The data output from retimer 73 is applied to D flip-flops 74-0 through 74-14 which are serially connected to form a shift register delay line. The input and output of flip-flop 74-0 are respectively applied to the first and second inputs of multiplexer 76. The remaining inputs to multiplexer 76 are provided by the outputs of flip-flop 74-1 and intermediate flip-flops inferred by FIG. 3. The outputs of other inferred flip-flops provide all but the final input signal for multiplexer 77, flip-flop 74-14 provides the final input for multiplexer 77.

Hex rotary switch 78 controls the selection of one of the possible outputs of multiplexers 76 and 77 for application to retimer 79. The data output of retimer 79 is converted back into complementary or balanced form by line driver 81. Line driver 82 provides the same conversion for the clock signal.

In operation static aligner 18 provides a delayed version of the data signal in accordance with the setting of switch 78. In other words, only one signal path through multiplexers 76 and 77 is completed according to the 3-bit signal status on lines 84 and enable lines 82. The selected signal is passed on to retimer 79. Available at the inputs of multiplexers 76 and 77 by virtue of the operation of flip-flops 74-0 through 74-14 is a plurality of data signals successively delayed in 1-bit increments. As previously described, switch 78 is manually adjusted to provide the appropriate delay for its associated regular or service channel signal on the A rail. The A rail signal has its own delay interval established by Section B of aligner 18.

Figure 4:
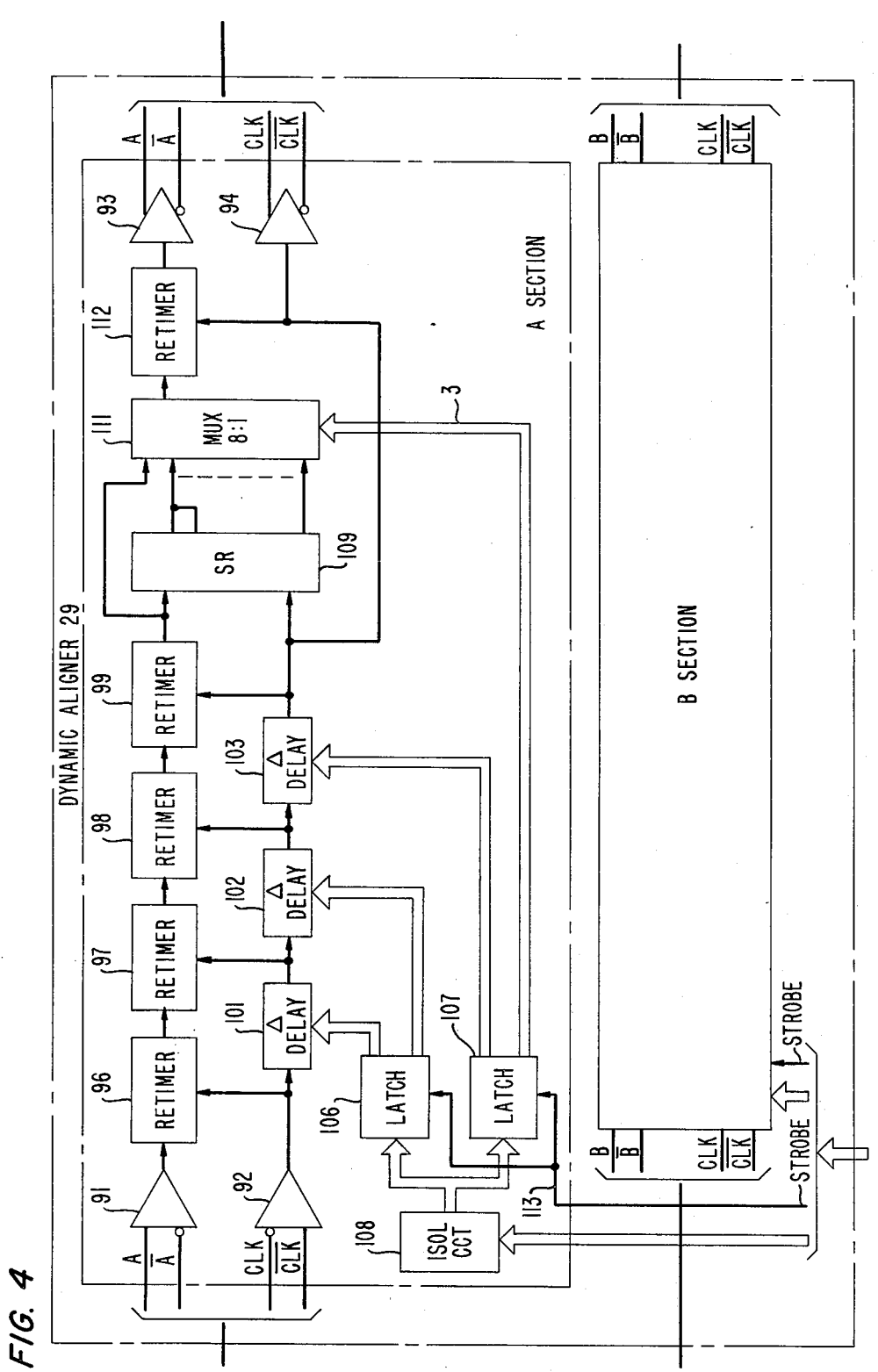
FIG. 4 depicts a suitable circuit for dynamically varying channel signal propagation delay in fixed increments and in bit increments.

FIG. 4 illustrates the internal circuitry of dynamic aligner 29 which includes identical A and B sections of which only A is shown in detail. Similar to static aligner 18, dynamic aligner 29 utilizes line receivers 91 and 92 for providing single ended data and clock signals and also line drivers 93 and 94 for providing balanced outputs for the data and clock signals. The output of receiver 91 is applied to serially connected retimers 96–99 while receiver 92 supplies a clock signal for variable delays 101–103 serially connected. Retimer 96 insures that the correct timing relationship exists between the data and the clock signal for the remainder of the circuitry in aligner 29. Retimers 97–99 each serve to delay the data signal in accordance with the respective delay provided by variable delays 101–103. An amount of delay less than a bit interval is provided by delays 101–103 as a function of the output of latches 106 and 107. The input to latch 106 and 107 is provided by isolation circuit 108 which is connected to line switch control 34 of FIG. 1.

Retimers 97–99 each provide an amount of delay in accordance with the controlled setting of their respective delayed clock signal. Variable delays 101–103 are tapped delay lines with adjacent taps providing a small increment in delay for the clock signal which corresponds to a small portion of a bit interval in the data signal. A bit interval also corresponds to the delay interval present between adjacent or successive clock signals. It should be understood that this portion of aligner 29 will be referred to as the fine portion since it provides delay adjustments in increments less than the duration of a single bit in the data stream.

The data signal from retimer 99 is applied to shift register 109. The clock or strobe signal to shift register 109 is provided by the output of variable delay 103. The input to register 109 and various outputs are concurrently applied to multiplexer 111. The operation of register 109 and multiplexer 111 provides the same function as described in connection with flip-flops 74 and multiplexer 76 in aligner 18. In this case, however, latch 107 controls the selection of the output from multiplexer 111 from one of its inputs. Retimer 112 reestablishes the appropriate relationship between the clock and the data signal for the output of aligner 29. The cooperation of register 107 with multiplexer 111 provides from zero to 7-bits of delay and will be referred to hereinafter as the coarse delay. A strobe signal on line 113 is provided by line switch control 34 of FIG. 1 to clock latches 106 and 107.

It should be understood that aligner 29 is adapted for use in the protection channel of FIG. 1. Accordingly, its operation is automatically controlled by line switch controller 34. It is the function of this automatic operation to provide signal channel alignment between a regular channel and a protection channel so that signal channel substitution may be effected without introducing bit errors in the digital bit stream being transmitted over the radio system of FIG. 1.

Figure 5:
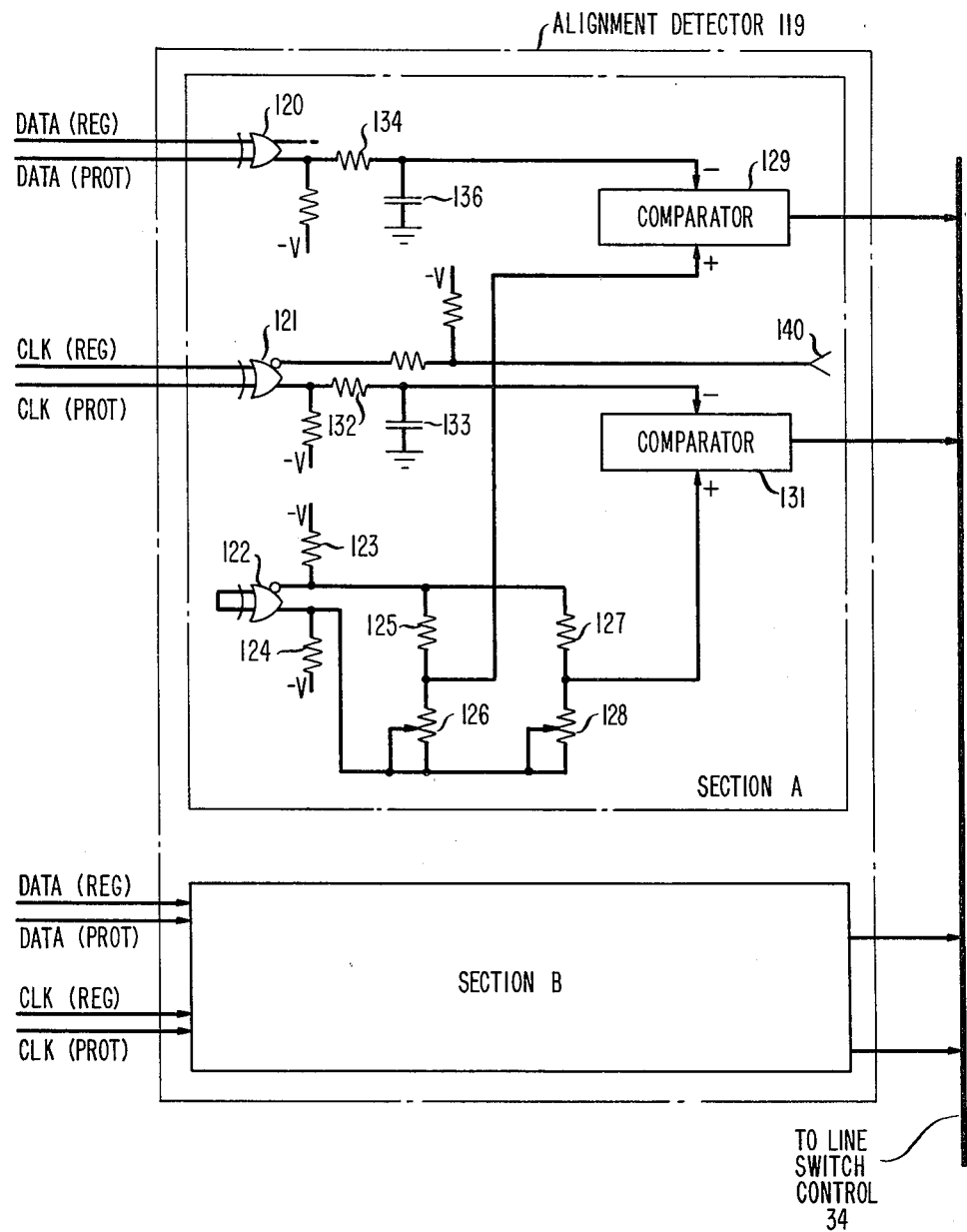
FIG. 5 is a diagram of an alignment detector for utilization in FIG. 2.

FIG. 5 depicts an alignment detector suitable for utilization in receive line switch 19 of FIG. 1. Alignment detector 119 receives the data signals from the regular channel and the protection channel at exclusive OR gate 120. Clock signals derived from the respective channels are applied to exclusive OR gate 121. It should be pointed out that the input signals applied to alignment detector 119 are obtained directly from a point in receive line switch 19 in order to insure they are representative of the channel signals at the point of switching. A third exclusive OR gate 124 in detector 119 has a tied together pair of floating inputs with its outputs connected to a resistive network including resistors 123–128 for the purpose of providing reference potentials for comparators 129 and 131.

When the clock signals applied to gate 121 are perfectly in phase then the noninverted output of the gate will produce a steady low state. When the input signals are not in phase then gate 121 produces positive going pulses having a width proportional to the misalignment of the input signals. The pulse output of gate 121 is averaged by an integrator formed by resistor 132 and capacitor 133. The average output is applied to the remaining input of comparator 131 which produces an output for line switch control 34 based upon the reference level provided by gate 122.

Similarly, the state of signal alignment with data signals is provided by the output of gate 120 which feeds an average detector formed by resistor 134 and capacitor 136. This average signal is compared to the reference level derived from gate 122. It should be pointed out that the reference levels applied to comparator 131 corresponds to the predetermined value of misalignment of the clock signals. The reference level applied to comparator 129 similarly corresponds to a predetermined value of signal misalignment. Also present in detector 119 is jack 140 which provides a pulse wave form output from the inverting output terminal of gate 121 which may be used to observe pulse widths as an indication of clock misalignment.

Section B is simply shown as a block since its internal circuitry is identical to that of Section A. Both sections of detector 119 provide output signals indicative of the relative alignment of the data and clock signals for each rail of the signal channel so that line switch control 34 may initiate a procedure for channel substitution in accordance with the output of the violation monitors of FIG. 1.

In order to provide a better understanding of the invention, a specific application of the inventive principle will be described. The A rail and B rail channel signals carry digital information at the Bell System DS3 rate (44.736 MBPS) with both rails modulating in tandem an IF carrier of 70 MHz, so that one rail falls in the frequency spectrum below the carrier and the other is in the frequency spectrum above the carrier. The actual signal that this arrangement operates with is the uncoded unipolar data signal although the transmitted signal is coded bipolar three-zero-substitution (B3ZS). In the B3ZS coded data format, correct determination of its uncoded value requires memory of a finite span of prior data. Accordingly, error free protection of the latter may not be provided by mere alignment of two B3ZS signals which is avoided by working directly with the uncoded unipolar data signals.

In the design of the actual circuitry, each one of static aligners 18 was designed to provide up to 335 NSEC of delay which corresponds roughly to 15 bit periods. Each bit period has a duration of 22.35 NSEC at the DS3 rate. As previously mentioned, the purpose of static aligners 18 is to reduce the static delay between channels to a range corresponding to the capability of dynamic aligner 29 in the protection channel. Dynamic aligner 29, in this case, has a total range of 9 bits or about 223 NSEC of delay. This range if further divided into a fine portion with 21 to 63 NSEC of delay in increments of 2 NSEC and a course portion of zero to 156 NSEC of delay in bit increments of 22.35 NSEC each. The alignment procedure basically combines two operations, first fine clock alignment from clock signals extracted from each channel signal is achieved, then data alignment is provided using course delay shifts of bit periods.

Figure 6:
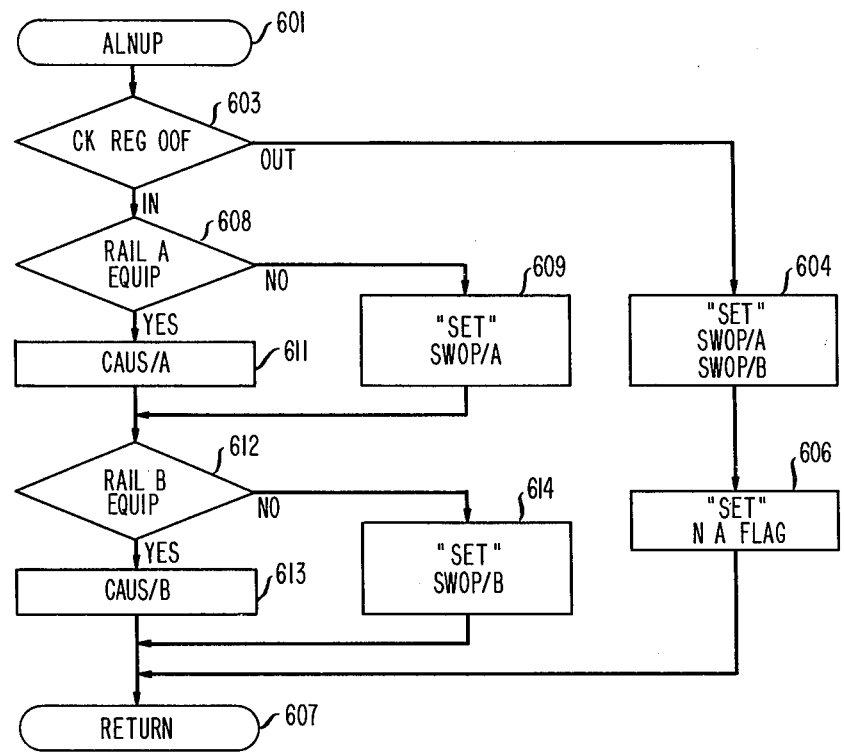
FIG. 6 is a flow diagram of the basic procedure used to establish channel signal alignment.

FIG. 6 is a flow chart of the channel signal alignment procedure used by control 34 to substitute the protection channel for a regular channel. Three different symbols are utilized: ovally shaped symbols indicate the beginning and ending of the routine; rectangular symbols, commonly referred to as operational blocks, require the performance of a particular operational step; and diamond shaped symbols, commonly referred to as either conditional branch points or decision blocks, require a test to be performed to determine the course of the following operation. The procedure starts with alignment up (ALNUP) oval 601 when one of violation monitors 20 signals an error condition. Additionally, it should be pointed out that a manual switch by an attendant may be used to start ALUP. This manual operation is a convenience provided for maintenance purposes. At this point, the head end bridging is completed so both the troublesome regular channel and the protection channel are carrying the same digital bitstream.

At conditional branch point 603, a check is made for an out-of-frame condition from the violation monitor for the troublesome regular channel. If framing is out, block 604 is the next step. Since an out-of-frame condition is an extreme error condition, set switch operate (SWOP/A&B) for the A and B rails are indicated in block 604. Simply stated, this is a direct substitution of the protection channel for the regular channel without the benefit of signal channel alignment. In block 606, a set no alignment flag (N A FLG) is used to indicate this operational status before proceeding to oval 607. These two simple operations of block 604 and 606 effectively bypass the alignment procedure, when its attempt would be futile.

If framing is maintained, as is the more normal course of operation, the next event is branch point 608. At conditional branch point 608, the status of a switch is checked to ascertain if the A rail is actually being utilized to carry information. If not, the procedure advances to block 609 and "set" switch operate for the A rail (SWOP/A) is done to produce a direct substitution for the A rail portion by the A rail portion of the protection channel. This bypasses block 611 which calls alignment up subroutine for the A rail (CAUS/A) which will be described in connection with FIG. 7. The same type of operation is now done for the B rail using the operations specified by blocks 612 and 613. Also, if the B rail is not being used, the procedure is to bypass block 613 via block 614 which directs the setting of switch operate for the B rail (SWOP/B).

Figure 7:
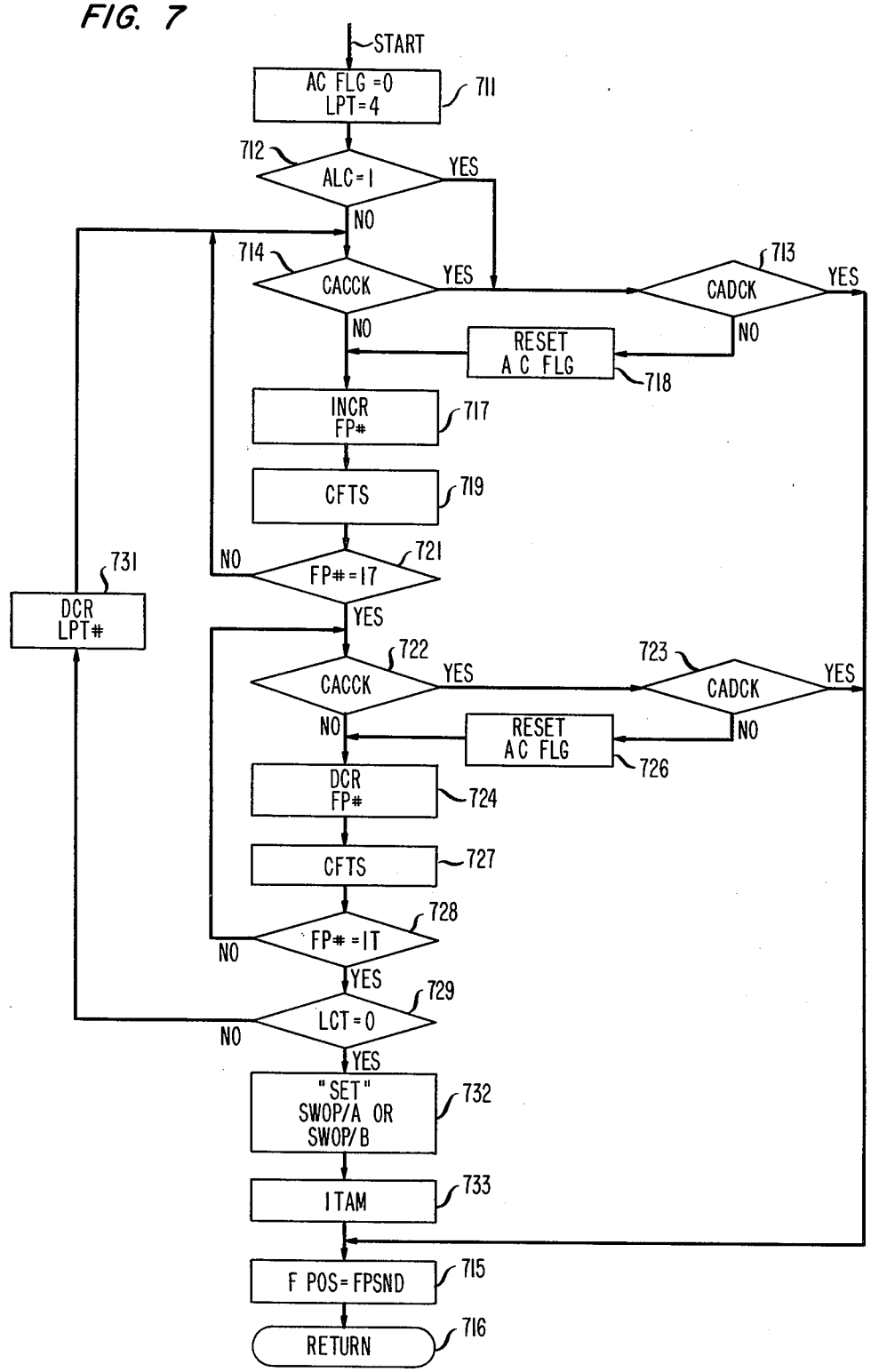
FIG. 7 is a flow diagram of a channel signal alignment subroutine used in FIG. 6.

FIG. 7 is a flow chart of the alignment procedure which is utilized for either rail of the channel signal. At the beginning of the procedure in block 711, the alignment clock flag is assigned a zero value and the loop point (LPT) is assigned a value of four. Next, at conditional branch point 712 clock alignment is checked. If clock signal alignment is present the procedure advances to conditional branch point 713. If, however, clock signal alignment is not present, the next operation is call alignment clock check (CACCK) 714, which is another subroutine to be described hereinafter, to provide the alignment before advancing to branch 713. At branch point 713 call alignment data check (CADCK) is still another subroutine for providing data alignment after clock signal alignment. If both clock and data alignment are obtained then the procedure advances to block 715 wherein the fine position value of the dynamic aligner 29 in FIG. 4 is recorded and the next step is return 716.

If neither data nor clock alignment is completed at conditional branches 713 and 714, the next operation is to increment the fine position number in block 717. Block 718 is used to reset the alignment clock flag when data alignment is not obtained before arriving at block 717. With the new incremented value of the fine position number, the next operation is to call the fineout subroutine (CFTS) indicated in block 719. This subroutine is described in connection with FIG. 8.

Next in the procedure is conditional branch point 721. Therein the final position number is checked for the value of 17. If the fine position number has not been incremented up to value 17, the flow loops back to conditional branch point 714. If the value is 17, the next operation is to call alignment clock check (CACCK) at branch point 722. Now clock alignment is checked and if alignment is ascertained, the next operation is to call alignment data check (CADCK) at conditional branch point 723. If the two conditions of clock and data alignment are verified, the procedure advances to block 715.

If not, the flow is directed to block 724 wherein the position number is decremented. Block 726 resets the alignment clock flag back to zero. This means that since data alignment could not be obtained that the original status of clock alignment was in error and that the clock alignment has to be redone. After the fine position number is decremented, the next operation is block 727 wherein the subroutine of FIG. 8 is used.

The next step in the procedure is the test of conditional branch point 728 wherin an initial value of the fine position number is checked. If the initial value is not obtained, then the flow loops back to conditional branch point 722. When the initial value is obtained, the flow advances to conditional branch point 729 wherein the status of the loop point is checked for zero. If not, the procedure loops back to conditional branch point 714 via block 731 wherein the loop point number is decremented.

Should the loop point number reach zero at conditional branch point 729, it signifies that the operations that occur in the procedure from conditional branch point 714 through to 729 have been performed four times without obtaining data or clock alignment. The error condition of the regular channel has thus been present too long, and the procedure advances to block 732 which directs the setting or completion of the switch operate A rail signal path. The next step is block 733. In block 733, an initialization of alarm (ITAM) operation serves to indicate the status of the alignment operation on a control panel at the equipment site for maintenance purposes.

Figure 8:
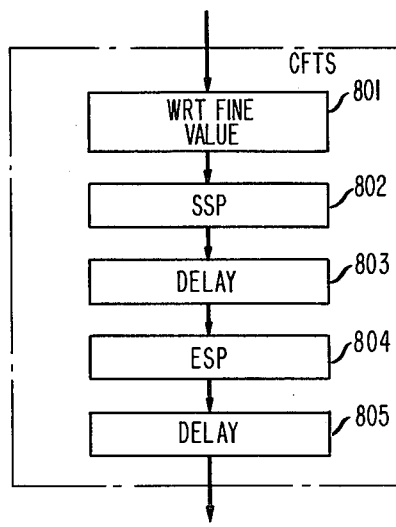
FIG. 8 illustrates a subroutine utilized in FIG. 7.

FIG. 8 is simply a direct sequence of operations for applying the new number value of FINE to dynamic aligner 29 of FIG. 4. First, block 801 specifies writing the new FINE value out of control 34 of FIG. 1. Then, in block 802, start strobe pulse (SSP) directs the beginning of the strobe pulse for lead 113 which duration corresponds to an amount in accordance with block 803. After the new value of FINE is applied to the latches 106 and 107 of aligner 29, block 804 specifies end strobe pulse (ESP). Block 805 provides another delay before going back to block 721. This enables the integration operation of aligner 29 to stabilize at a new value in accordance with the readjusted channel signal alignment.

Figure 9:
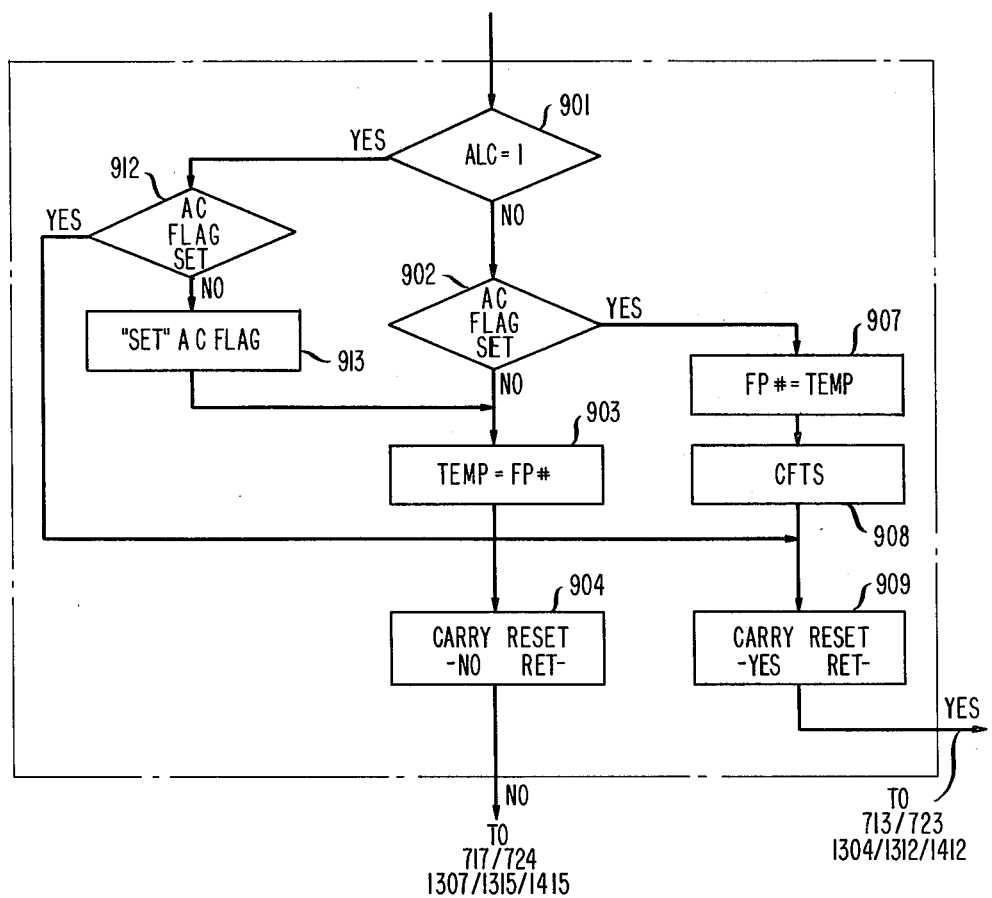
FIG. 9 is a flow chart of a subroutine used to check clocking signal alignment.

FIG. 9 is a flow chart of alignment clock check which is called at conditional branch points (labeled CACCK) 714 and 722 in FIG. 7. At the start of the procedure, conditional branch point 901 requires a verification of the status of the alignment detector. A logical one indicates that clock alignment is present while a logical zero represents the opposite condition. This is obtained simply by logically inverting the output signal produced by the detector of FIG. 5. When signal alignment is out, the procedure advances to decision block 902 which checks the status of the alignment clock (AC) flag which may have been reset at one of block 718 or 726 of FIG. 7. If not, block 903 is next wherein the fine position number (FP#) is stored before advancing to block 904. In block 904, a bit designated as carry reset and no return is established. This advances the procedure to the next operational block in FIG. 7 which may be either one of blocks 717 or 724.

If the alignment clock flag is set at conditional branch point 902, the flow advances to block 907 which utilizes the fine position number previously stored in block 903. Next block 908 calls the fine out subroutine (CFTS). The subroutine as previously mentioned is represented by FIG. 8 and is used to change the fine increment setting of dynamic aligner 29 in FIG. 4. Then the procedure advances to block 909 which sets the bit designated as carry set and yes return before advancing to eithr 713 or 723 as may be appropriate.

The route in the flow chart of FIG. 9 described in the immediately foregoing paragraph serves to double check the performance of the detector of FIG. 5. In other words once clock alignment seems to be established, but a subsequent change in the dynamic aligner setting was not necessary, the previous setting is used. It should be pointed out, however, that this performance characteristic is related to the hardware being used and the choice of magnitude for the fine increment.

At conditional branch point 901, an indication of clock alignment advances the procedure to conditional branch point 912. At branch 912, the status of the alignment clock flag setting is ascertained. If the alignment clock flag is not set, the flow advances to block 913 which calls for setting the alignment clock (AC) flag before advancing to block 903. If at conditional branch point 912, the alignment clock flag has been already set the procedure advances to operational block 909. Advancement from that point forward is as has been previously described.

The latter described path indicates that clock alignment has been established even after a second change in the fine increment setting of dynamic aligner 29. As previously described, this is required due to a certain amount of play in the alignment detector circuit of FIG. 5 in relation to the selection of the magnitude of the fine increments being used. A condition of first obtaining clock alignment is represented by advancing from branch pooint 912 to block 903 via block 913.

Figure 10:
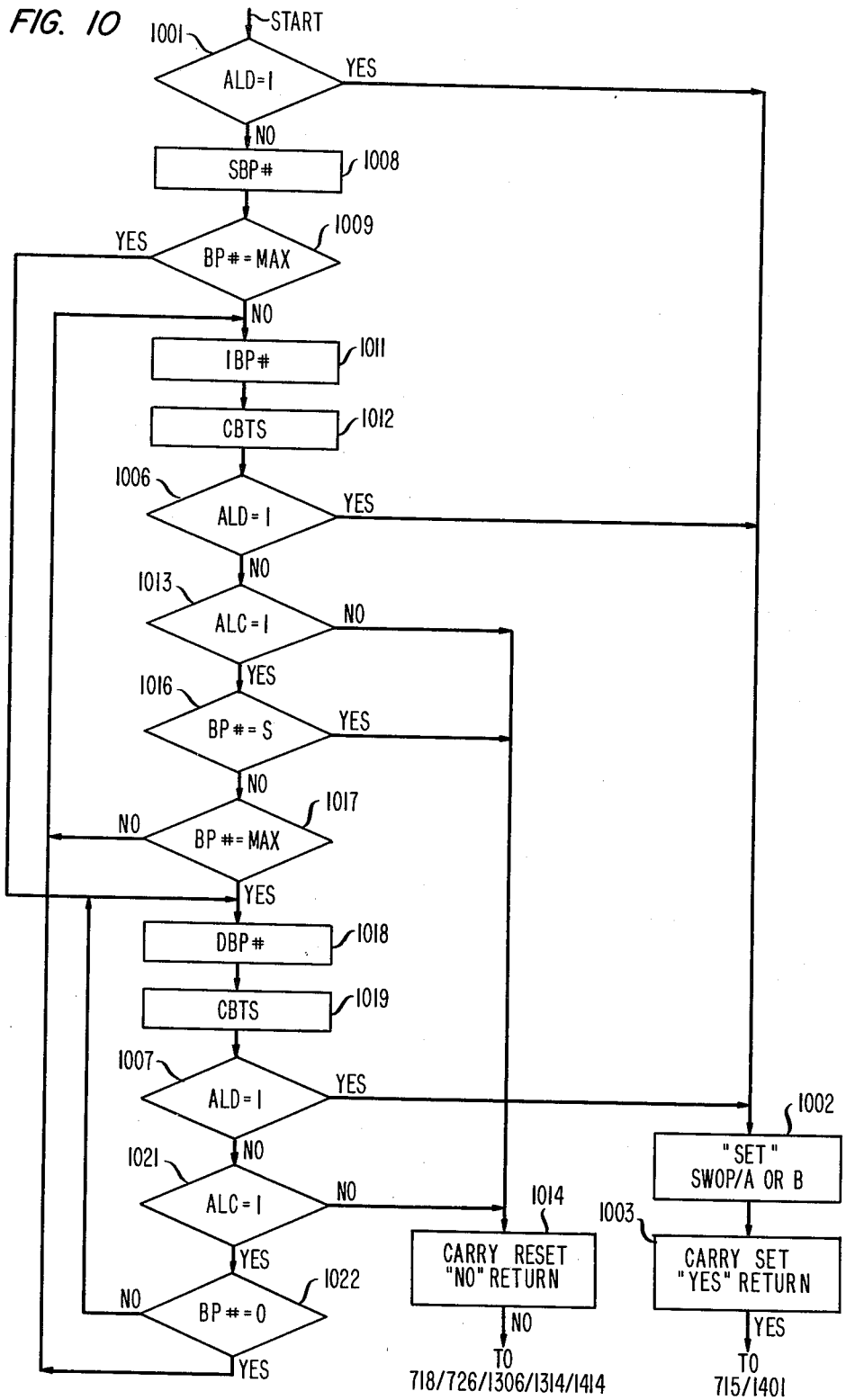
FIG. 10 is a flow chart of a procedure used to provide data alignment.

FIG. 10 depicts a flow chart of the procedure for obtaining data alignment. The procedure of FIG. 10 is initially utilized at either conditional branch point 713 or 723 of FIG. 7. Subsequently, this procedure is also used in FIG. 15. In FIG. 7, data alignment occurs after clock alignment is obtained. At the start, the status of the data alignment by alignment detector 91 of FIG. 5 is ascertained. If the data is in alignment for the regular and the protection channels, the alignment data (ALD) bit is set to a logical one value at conditional branch point 1001. Next, operational block 1002 requires either switch operate A or B to be set as appropriate. Accordingly, an operation commences for substituting the appropriate signal rails of the protection channel for the regular channel. Finally, in operational block 1003 a single bit is set designated as carry and yes return for exiting at the yes output which advances the general procedure, in this case, to operational block 715 of FIG. 7. Conditional branch points 1006 and 1007 also provide entry into block 1002.

Back at conditional branch point 1001, a logical zero value for the ALD bit results in an advancement to operational block 1008 wherein the initial value of the bit position number (BP#) is obtained. It should be pointed out that the implementation of dynamic aligner 29 of FIG. 4 provides a range of 7 bits by virtue of shift register 109. Multiplexer 111 then selects one of the outputs of register 109 in accordance with the input from latch 107 in FIG. 4. In this case an initial value of 3, corresponding to a 3 bit delay, is set in block 1008 before advancing to conditional branch point 1009 which checks to see that the bit position number has not obtained maximum value. If the bit position number is not maximum, the flow advances to block 1011 wherein the bit position number is incremented before advancing to block 1012.

Figure 11:
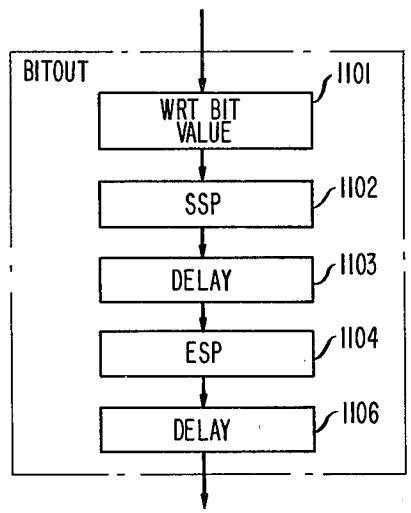
FIG. 11 is a sequence of steps utilized in FIG. 10.

In block 1012, a bitout subroutine is called (CBTS) which is illustrated in FIG. 11. Accordingly, this changes the value of the bit delay provided by dynamic aligner 29 of FIG. 4 before the output of alignment detector 91 is checked at conditional branch point 1006. Should the increment in block 1011 not produce data bit alignment, the flow advances from conditional branch point 1006 to conditional branch pont 1013 wherein the status of clock alignment is checked again. If clock signal alignment is not indicated then the flow advances to operational block 1014 wherein a bit designated as carry reset and no return is set accordingly before exiting at the no output. As a result, the flow in the general procedure of FIG. 7 arrives at the appropriate one of blocks 718 or 726 back in FIG. 7.

Should clock signal alignment be indicated the flow advances to conditional branch point 1016 wherein the current bit position number is checked to see if it equals the saved value. If so, the flow advances to block 1014. If not, the flow advances to conditional branch point 1017 wherein the bit position number is checked again for a maximum value. If not, the flow loops back to block 1011 for incrementing the bit position number again. When the bit position number reaches the maximum, the flow advances to operational block 1018 for decrementing it before advancing to block 1019 which readjusts dynamic aligner 29 before checking the output of detector 91 as required at conditional branch point 1007. Should data alignment not obtained due to decrementing the bit position number in accordance with block 1018 then, conditional branch point 1021 is next. If, on the other hand, data alignment is obtained upon checking the value of the ALD bit, the flow advances to block 1002.

At conditional branch point 1021 the absence of clock alignment directs the flow to block 1014. If the clock alignment is still indicated, the flow may loop back to operational block 1018 via conditional branch point 1022. When the bit position number has reached zero, conditional branch point 1022 loops the flow back to operational block 1011 for incrementing.

FIG. 11 is a sequence utilized to reset the value of the data bit delay utilized in dynamic aligner 29 in accordance with the procedure of FIG. 10. It should be pointed out that it is identical to that of FIG. 8 for the fineout subroutine. Both only serve to produce a strobe pulse of fixed duration. Accordingly, reference numerals in FIG. 11 whose last two digits correspond to those of FIG. 8 are used to designate equivalent operational blocks.

Figure 12:
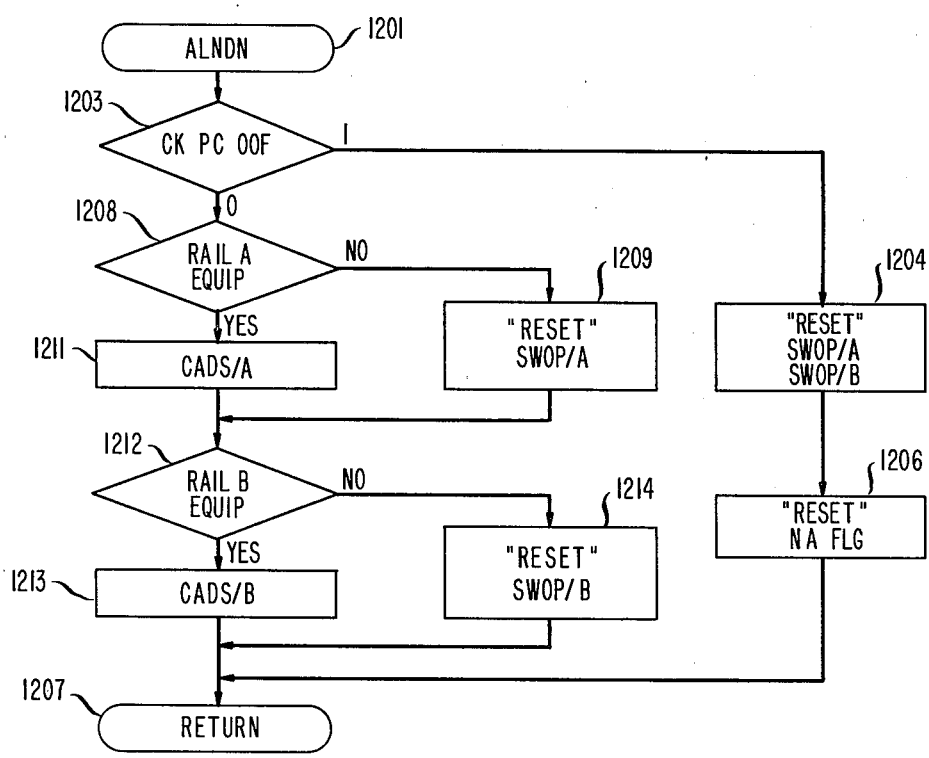
FIG. 12 is a flow chart of the general procedure used to adjust signal propagation delay when disconnecting the protection channel.

FIG. 12 depicts the general procedure for taking down the protection channel. The point of operation for the system of FIG. 1, at this time, is that the protection channel has been substituted for one of the regular channels and violation monitor 33 indicates that transmission quality of the regular channel is restored. Accordingly, the reverse prodecure is being implemented so that the protection channel may be removed from service by substituting the regular channel back in service. This frees the protection channel for ready availability as a spare for substitution when necessitated by an error condition in any one of the regular channels.

The procedure starts with alignment down (ALNDN) oval 1201. Conditional branch point 1203 is next wherein the framing condition of the protection channel is checked. If the protection channel is out-of- Manual", published by Intel, dated March 1977. Programming of the 8085 is described in the Intel 8080/85 "Assembly Language Programming Manual", dated 1977. Associated clock 1603, in this case, was selected to run at a 4 MHz rate. Data memory 1604 stores data from internal operations available from microprocessors 1602 via bus 1606.

Bus 1606 is connected to bus buffer 1607 and extends beyond as bus 1608 to connect the remaining components to help in forming control 34. Memory 1609 provides the stored program for microprocessor 1602. The input/output unit (I/O) 1611 issues control signals for transmit switch 21 of FIG. 1 and receives switch verification signals. Input/Output unit (I/O) 1612 provides the same function for receive switch 31. Similarly, I/O 1613 is instrumental in controlling the operation of common switch 32. Information on channel alignment to be processed in providing error free channel substitution under the direction of CPU 1601 is obtained from interface 1614 which also serves to change the delay in dynamic aligner 29. Also on bus 1608, I/O 1616 directs the input selection used in each of receive line switches 19. Error circuit 1617 provides the error processing from each of violation monitors 20 and violation monitor 33 used as the switch request information for initiating channel substitution.

What is claimed is:

1. A transmission system (FIG. 1) having digital channels and clocking signals derived from each digital channel, the transmission system being capable of bridging one of a plurality of regular digital channels with a digital protection channel so both channels are carrying the same digital signal from a first location of the system; the transmission system comprising:

shifting means (29) for adjusting the relative delay of the digital signals between the protection channel and the impaired channel, said shifting means capable of being adjusted in fine steps fractionally related to a bit period and in coarse steps equal to a bit period;

detecting means (119) for indicating alignment of the adjusted relative delay of both digital channel signals to produce a data alignment output, said detecting means receiving clocking signals, one derived from each one of both channels, to produce a bit alignment output;

controlling means (FIG. 16) for providing bit and data alignment before issuing a switching control signal, said controlling means including first logic means for adjusting the shifting means in fine step in a first direction from an initial value to a first extreme value and then in the opposite direction from the first extreme value to the opposite extreme value, said first logic means responsive to the bit alignment output of the detecting means by stopping the adjustment of the shifting means when bit alignment is indicated, and second logic means for providing data alignment by adjusting the shifting means to produce coarse steps in one direction to an extreme value and coarse steps in the reverse direction to the opposite extreme value, said second logic means responsive to the data alignment output of the detecting means by stopping the adjustment when data alignment is indicated; and switching means (19), at a second location of the system remote from the first location, for substituting the digital signal of the protection channel for the one channel in response to said switching control signal after both bit alignment and data alignment are obtained.

2. In a transmission system according to claim 1 wherein said controlling means further includes recycling means for reactivating said first and second logic means when said detecting means fails to indicate alignments after the use of said first and second logic means.

3. In a transmission system according to claim 2 wherein the controlling means further includes means for providing a predetermined value before said first logic means is initially used, altering means for changing the predetermined value each time said recycling means is used, and alternative means for activating said switching means when the changing of the predetermined value by said altering means obtains a prescribed limit.

4. In a transmission system according to claim 3 wherein the controlling means further includes third means for checking said detecting means for indications of bit alignment and data alignment, said third means checking for bit alignment after said second logic means adjusts the shifting means each coarse step in a first direction when said detecting means fails to indicate data alignment, and said third means signalling said first logic means when bit alignment is not indicated so that the shifting means will be readjusted to provide bit alignment.

5. In a transmission system according to claim 4 wherein the controlling means further includes fourth means for checking said detecting means for indications of bit alignment and data alignment, said fourth means checking for bit alignment after said second logic means adjusts the shifting means each coarse step in a second direction when said detecting means fails to indicate data alignment, said said fourth means signalling said first logic means when bit alignent is not indicated so that the shifting means will be readjusted to provide bit alignment.

6. In a transmission system according to claim 5 wherein the controlling means includes fifth means for retarding said shifting means a fine step reverse to the direction of adjustment once the detecting means indicates bit alignment, said fifth means using the first time steps as the adjustment for said shifting means that produces a reliable bit alignment indication from the detecting means.

7. A line protection switch used to bridge as impaired one of a plurality of regular digital channels with a digital protection channel so both channels are carrying the same digital signal; switching means for substituting the digital signal of the protection channel for the impaired regular channel; monitoring means for indicating when each digital channel is impaired and when a digital channel is in extreme error condition by signaling an out-of-frame condition; delaying means for adjusting the relative relay of the signals from the protection channel and the impaired channel; said delaying means capable of adjustment in fine steps fractionally related to a bit period and in steps equal to a bit period; means for deriving a clocking signal from the digital signal of each digital channel; detecting means for indicating alignment of the adjusted relative delay of the two channel signals to produce a data alignment output and receiving clocking signals, one derived from each channel, to produce a clock alignment output; controlling means including a microprocessor programmed to follow a process, said controlling means bypassing the process when an out-of-frame condition is indicated by frame (PC OOF), precision alignment is not warranted and is effectively bypassed via operational blocks 1204 and 1206. In block 1204, switch operate (SWOP) for the A rail and B# rail are reset. As a result, an immediate substitute of the regular channel for the protection channel is initiated. In block 1206, the no alignment (NA) flag is reset before proceeding to an initial condition as represented by oval 1207.

If, on the other hand, the protection channel has current framing, conditional branch point 1208 is next after branch point 1203. At branch point 1208 utilization of the A rail is checked and if the A rail is not being used, operational block 1209 is next wherein switch operate for the A rail is reset. If at conditional branch point 1208 the A# rail is being utilized, operational block 1211 is next. Block 1211 calls alignment down subroutine for the A rail (CADS/A). This subroutine is described in the subsequent discussion of FIGS. 13 and 14. Next in the procedure, an equivalent operation is provided by conditional branch point 1212 and operational blocks 1213 and 1214 as conditional branch point 1208 and operational blocks 1209, 1211 except for the B rail.

Figures 13, 15:
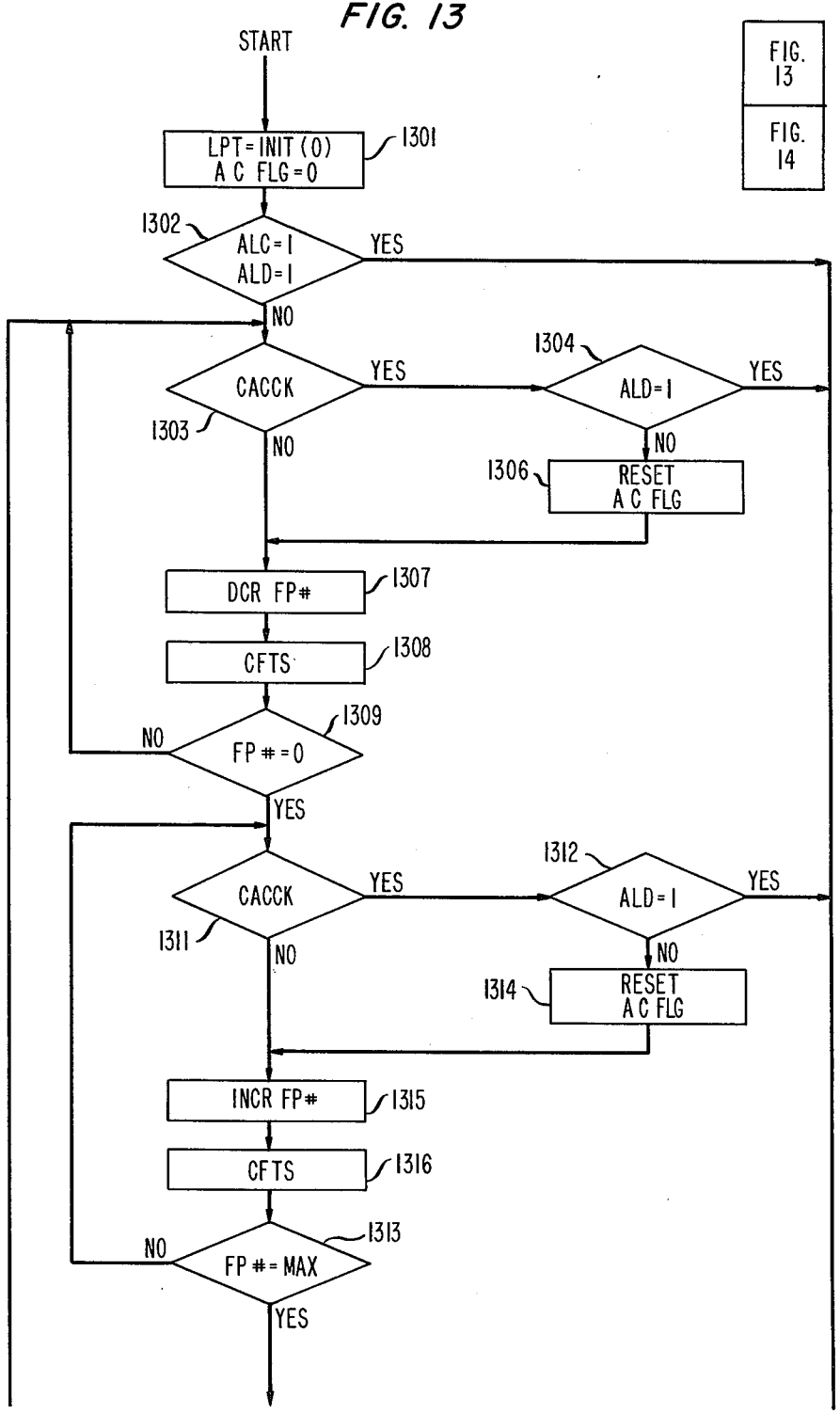
FIGS. 13 and 14, when juxtaposed according to FIG. 15, form a flow chart of the alignment down subroutine used for each active signal rail in a radio channel.
Figure 14:
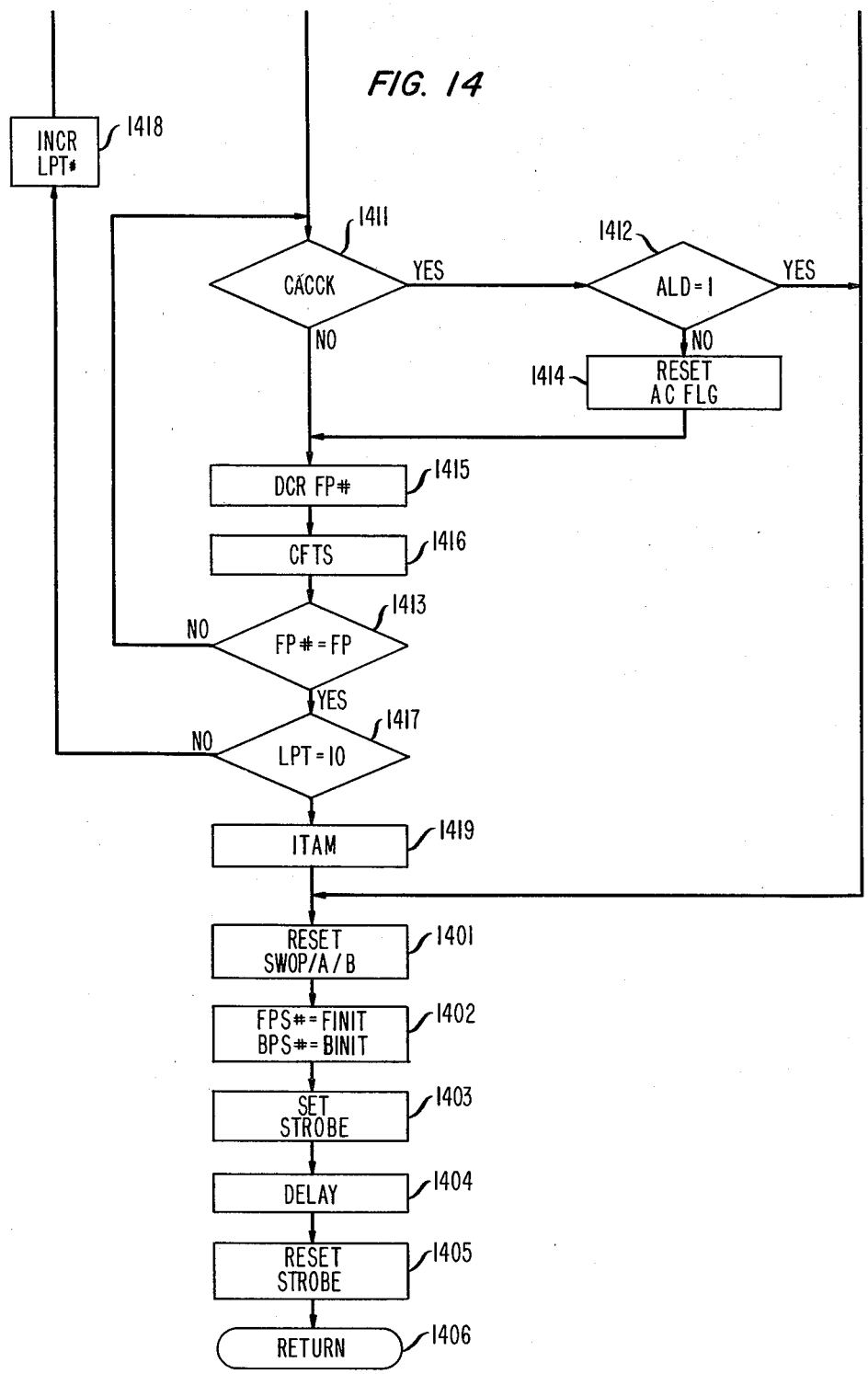

FIG. 15 which indicates the manner of combining FIGS. 13 and 14 to complete the alignment down subroutine, is utilized for either the A rail or the B rail respectively at operational blocks 1211 and 1213 of FIG. 12. The procedure starts with operational block 1301 wherein the loop point value is initialized to zero and the alignment clock flag is also set to zero before proceeding to conditional branch point 1302. At conditional branch point 1302, the clock alignment and data alignment outputs of alignment detector 119 are both checked to ascertain alignment. When both are in alignment, the procedure for slowly shifting the delay of the channel in service is bypassed by proceeding to operational block 1401 of FIG. 14 to provide an immediate channel substitution. The slow shifts in delay provided by single steps of the fine position number are utilized to prevent a loss of framing synchronization of the system of FIG. 1 while in operation. Then, operational block 1402 requires the fine position number (FPS#) and bit position number (BPS#) to both be initialized since the substitution of the regular channel for the protection channel has already occurred in accordance with the operational step of block 1401. Operational blocks 1402–1405 serve to establish a strobe pulse of a duration corresponding to the value of the delay required by block 1404. Dynamic aligner 29 is thus adjusted to correspond to the initial values for the fine position number and bit position number designated in block 1402. Oval 1406 which is next represents that the protection channel is now a standby channel with a propagation delay set at initial values available again for substitution of the next regular channel when the need arises.

At conditional branch point 1302 an indication of neither clock alignment nor data alignment provided by alignment detector 91 places conditional branch point 1303 next. Branch point 1303 calls for alignment clock check which is illustrated in FIG. 9. If clock alignment is indicated, conditional branch point 1304 follows. If data alignment is obtained, the procedure advances to block 1401. If not, operational block 1306 will follow. Block 1306 requires the alignment clock flag to be reset before advancing to operational block 1307. Block 1307 directs that the fine position number be decremented one position, and then in operational block 1308 the reduced fine position number is utilized to adjust dynamic aligner 29 in accordance with procedure illustrated by FIG. 8.

Conditional branch point 1390 requires the status of the fine position number to be checked for a zero value. If this value has not been obtained, the procedure loops back to conditional branch point 1303 so that the fine position number may again be decremented one more step if necessary. Accordingly, this loop back will be utilized until either clock and data alignment are obtained or the fine position number is reduced to zero. When the latter occurs, conditional branch point 1311 is next which again is the alignment clock procedure of FIG. 9.

Associated with conditional branch point 1311 are conditional branch point 1312, 1313 and operational blocks 1314–1316 which is the same type of procedure as that associated with conditional branch point 1303 except that now the fine position number is increased by incrementing. Again if clock and data alignment are obtained, the procedure advances to operational block 1401. Should neither be obtained before the fine position number reaches a maximum value, conditional branch point 1411 is next.

At this point, associated with branch point 1411 are conditional branch points 1412, 1413 and operational blocks 1414–1416 which provide the same type of procedure wherein the fine position number is again decremented until the initial value is reached. At this point, conditional branch point 1417 follows to check for a loop point value of ten. Until this value occurs, the procedure loops back to conditional branch point 1303 via operational block 1418 which increments the loop point once for each loop back. If the decrementing and incrementing operations associated with conditional branch points 1303, 1311 and 1411 do not provide both clock and data alignment before the loop point of ten is obtained, the procedure advances to operational block 1419 wherein the alarm status is updated before advancing to operational block 1401 wherein the regular channel is substituted for the protection channel without the benefit of alignment. However, in the vast majority of cases, it should be pointed out that clock and data alignment will be obtained before reaching a point where the protection channel is simply switched to the regular channel without the benefit of channel signal alignment. Normally, the occurrence of clock and data alignment enable an error free substitution of the regular channel for the protection channel in the alignment down procedure.

It should be pointed out that the procedure of FIG. 15 is used to adjust the signal timing of a channel while actually in service. Accordingly, the individual adjustment steps of dynamic aligner 29 were chosen to be small (e.g., 2 NSEC). This provides a tolerable transition or jitter between steps for the equipment of the system which maintains framing synchronization. The controller of FIG. 16 is also implemented to provide a tolerable spacing between successive adjustment steps of dynamic aligner 29 to preserve framing integrity in the transmission system.

Figure 16:
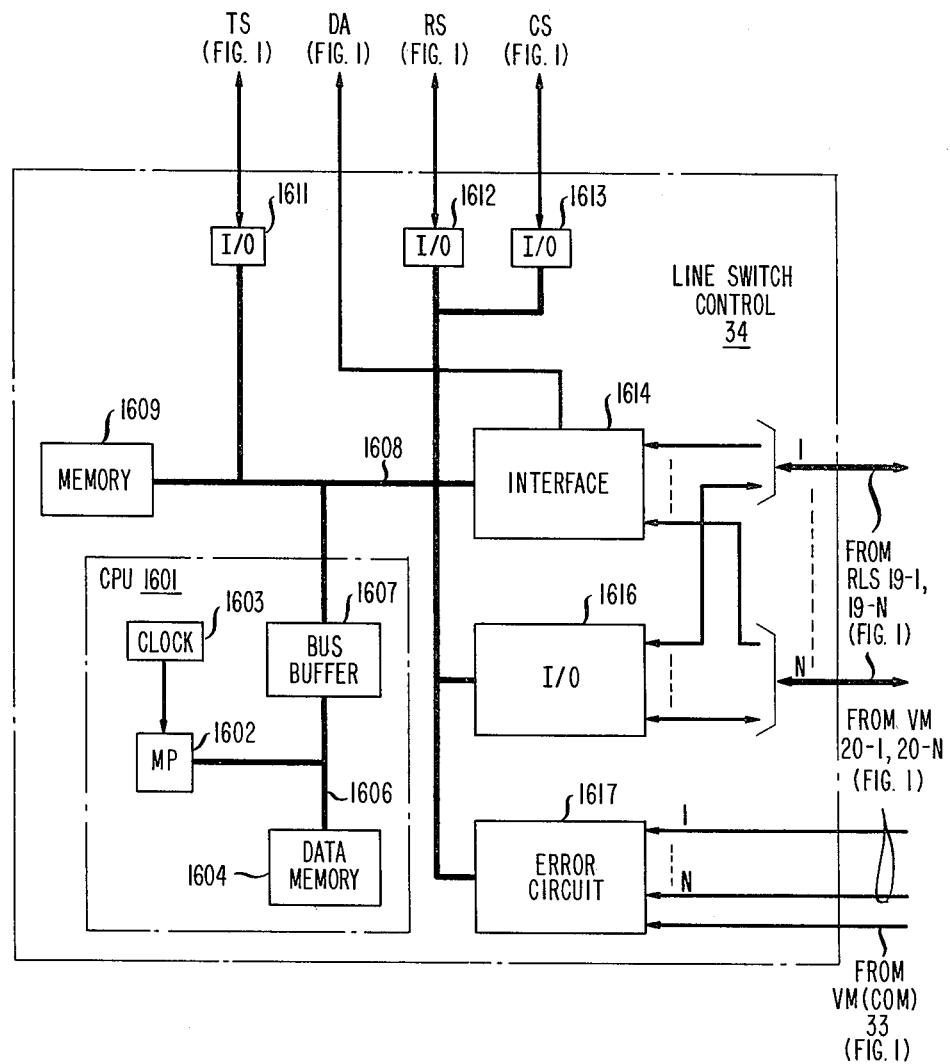
FIG. 16 is a block diagram of the line switch control employed in the system depicted in FIG. 1.

FIG. 16 is an arrangement for line switch control 34 which follows the various procedures illustrated in FIGS. 6 through 14. The heart of central processor unit (CPU) 1601 is microprocessor 1602 which may be one of any various microprocessors that are commercially available. In one implementation, an Intel 8085 and compatible associated elements were implemented. The 8085 and its operation are described in "MCS 85 User's forcing said switching means to switch directly without obtaining channel alignment, said controlling means producing clock alignment by varying the adjusted relative delay in fine steps in a first direction and reversing the direction of the adjusted relative delay in small increments until the detecting means indicates clock alignment, said controlling means provided data alignment by producing relative bit steps in the data signal in a first direction and then in an opposite direction until the detecting means indicates data alignment; and switching means for substituting the signal of the protection channel for the regular channel after both clock alignment and data alignment are achieved.

8. In a transmission system having a plurality of regular channels and a spare channel substituted for one of the regular channels so that both channels are carrying the same digital signal with the spare channel being in service, apparatus for restoring the service back to the one regular channel comprising:

shifting means for adjusting the relative timing of the digital signals between both channels in increments fractionally related to the duration of a bit in the digital signals and in steps equal to a bit period;

detecting means, coupled to receive the digital signal of the one regular channel and the spare channel, for indicating alignment of the digital signals of both channels, said detecting means including clocking means associated with each channel for deriving a clocking signal from their digital signals, said detecting means coupled to receive the clocking signals and indicating bit alignment; and controlling means for serving to produce an alignment indication by said detecting means, said controlling means checking for bit alignment indication from the detecting means before adjusting the shifting means in a first direction in increments to a first extreme value, said controlling means checking for bit alignment indication before adjusting the shifting means in increments in an opposite direction, said controlling means checking for signal alignment while adjusting the shifting means in steps in a first direction to predetermined extreme value and then in the opposite direction until signal alignment is indicated, and said controlling means directing the restoration of the regular channel for service to free the spare channel when signal alignment is first indicated by said detecting means.

* * * * *

UNITED STATES PATENT AND TRADEMARK OFFICE
CERTIFICATE OF CORRECTION

PATENT NO. : 4,395,772
DATED : July 26, 1983
INVENTOR(S) : Warren C. Trested, Jr.

It is certified that error appears in the above—identified patent and that said Letters Patent is hereby corrected as shown below:

Column 1, line 50, "screen" should read --stream--; line 61, "in" should read --of--. Column 6, line 21, the comma should be a period and "flip-flop" should read --Flip-flop--; line 33, "82" should read --83--; line 40, "The A rail" should read --The B rail--. Column 8, line 39, "if" should read --is--. Column 11, line 5, "eithr" should read --either--. Column 16, line 7, "alignments" should read --alignment--; line 43, "time" should read --fine--; line 47, "as" should read --an--. Column 17, line 7, "provided" should read --providing--.

Signed and Sealed this

Fourth Day of October 1983

[SEAL]

Attest:

GERALD J. MOSSINGHOFF

Attesting Officer

Commissioner of Patents and Trademarks